No. 777,229. PATENTED DEC. 13, 1904.
C. C. VAUGHN.
POWER TRANSMITTING MECHANISM.
APPLICATION FILED MAR. 31, 1904.
NO MODEL.

Witnesses:
Arthur L. Slee
D. H. McConnell

Inventor
Charles Carson Vaughn
by Walter F. Crane
his Atty.

No. 777,229.

Patented December 13, 1904.

UNITED STATES PATENT OFFICE.

CHARLES CARSON VAUGHN, OF SAN FRANCISCO, CALIFORNIA, ASSIGNOR OF ONE-HALF TO GEORGE J. McCONNELL, OF SAN FRANCISCO, CALIFORNIA.

POWER-TRANSMITTING MECHANISM.

SPECIFICATION forming part of Letters Patent No. 777,229, dated December 13, 1904.

Application filed March 31, 1904. Serial No. 200,976. (No model.)

*To all whom it may concern:*

Be it known that I, CHARLES CARSON VAUGHN, a citizen of the United States, residing in the city and county of San Francisco, State of California, have invented certain new and useful Improvements in Power-Transmitting Mechanism; and I do hereby declare the following to be a full, clear, and exact description of the same.

My invention relates to power-transmitting mechanism for traction-vehicles, and more especially to that class of vehicles known as "automobiles."

The object of my invention is to simplify the construction and to provide suitable mechanism whereby a gradual increase or decrease in speed may be given to the vehicle without interfering with the operation of the driving-engine.

My invention consists in the novel arrangement and combination of parts which I shall hereinafter fully describe.

Figure 1:
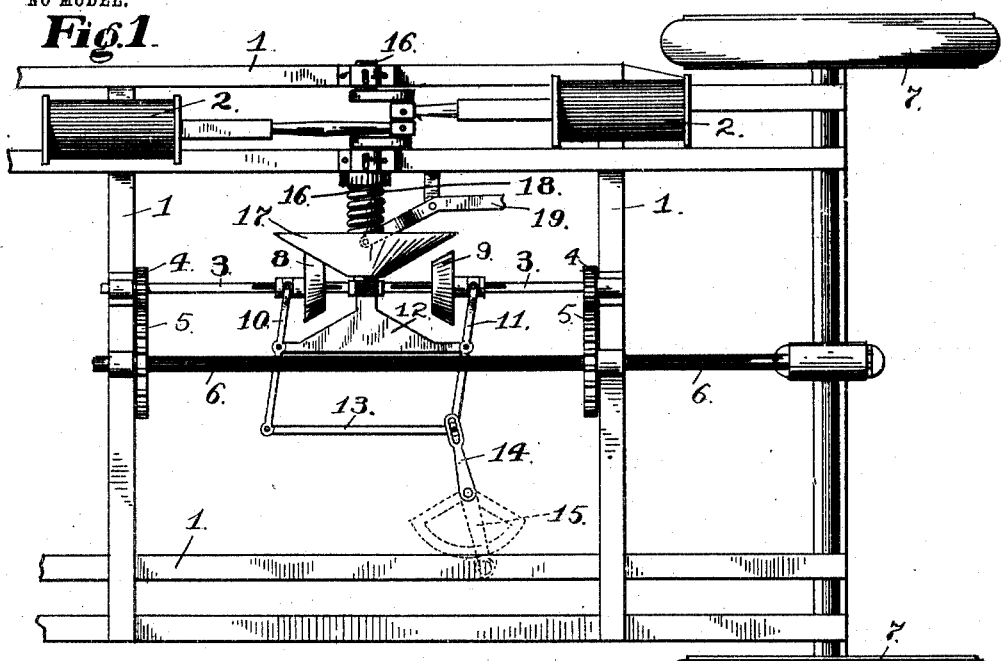
Figure 2:
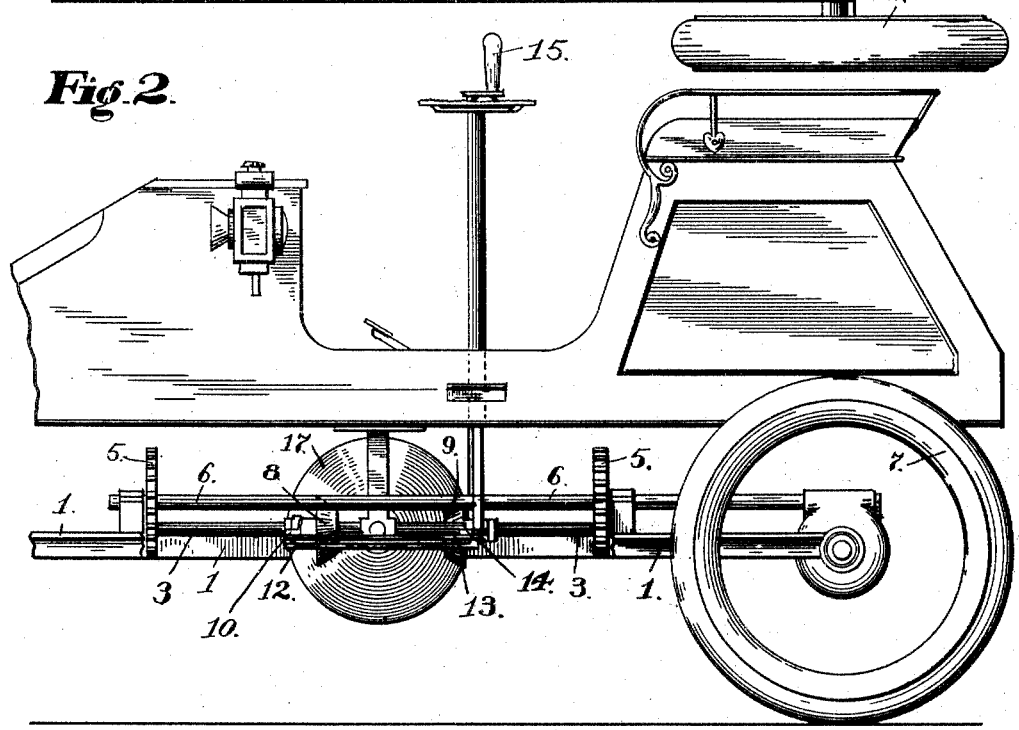

Referring to the accompanying drawings, Figure 1 is a top plan view of my improved mechanism attached to an automobile, the conical driving-gear and beveled pinions being enlarged to better illustrate them. Fig. 2 is a side view of the same.

1 is the frame of an ordinary automobile or other traction-vehicle, upon which is suitably mounted the propelling-engine 2.

3 is a counter-shaft mounted on the frame 1 in suitable bearings and having gears 4 meshing with the gears 5 of the main shaft 6, which drives the wheels 7.

Upon the counter-shaft 3 are feathered the sliding beveled pinions 8 9, connected to slide in unison by the rods 10 11, which are pivoted to the bracket 12, carried by the shaft 3, said rods being pivotally connected at their opposite ends by the link 13. At the point of connection of the link 13 with the rod 11 is pivoted the lever 14, adapted by suitable mechanism, not necessary herein to show, to be actuated by the operating-lever 15, as shown in Fig. 2.

On the power-shaft 16 of the engine, mounted suitably at right angles to the shaft 3, is slidably mounted the conical driving-gear 17, held normally in operative position by means of the spring 18. The driving-gear 17 is provided with a lever 19, adapted to move it back from its operative position.

The conical driving-gear 17 and the beveled pinions 8 9, although here shown as friction-gears, may be any suitable gears adapted to operate as described.

The operation is as follows: The conical driving-gear 17 is thrown back to clear the beveled pinions 8 9 by operating the lever 19. The engine is then put in motion, imparting movement to the said gear. The beveled pinion 8, which is the forward operating-pinion, is then moved inwardly by the operation of the lever 15 to a position near to the inner edge or smallest diameter of the conical gear 17. Then the conical gear is relieved by means of the lever 19 in order to allow it to come into engagement with the pinion 8, imparting motion thereto. The pinion 8 engaging with the gear 17 in its plane of smallest diameter, a minimum rate of speed is at first imparted to said pinion, and by gradually turning the lever 15 in a direction to move the pinion 8 toward the outer edge or planes of greater diameter of the gear 17 the speed of the pinion is gradually increased until the maximum speed is attained. By the operation of the lever 15 after the driving-gear 17 has been thrown by the spring into contact with the pinion 8 the speed of the pinion may be increased or decreased, as desired. As the pinion 8 imparts rotation to the shaft 3 said shaft through the gears heretofore mentioned imparts rotation to the wheels 7 of the vehicle. In order to reverse the motion of the vehicle, the lever 19 is moved to withdraw the gear 17 from engagement with the pinion 8. The lever 15 is then turned in the proper direction to throw the pinion 8 to a point on the shaft 3 which is beyond engagement with the outer edge or periphery of the conical gear 17, and by this same operation the reverse-pinion 9 is thrown inwardly to the smallest diameter of the gear 17, thus allowing said gear 17 when thrown into engagement therewith to reverse the travel of the vehicle by reversing the motion of the parts.

In constructing the gear 17 with a pressure-spring the beveled pinions 8 and 9 can alternately gradually be moved on the surface of said gear, imparting a gradual increase or decrease in speed to the vehicle, thus obviating the sudden jolts caused by increasing the speed in sudden jerks, as is the case in ordinary traction-vehicles, where the speed can only be increased and decreased by steps.

In order to stop the vehicle, it is only necessary to throw the lever 19 far enough to remove the gear 17 from contact with the pinions 8 and 9 and then apply the brake.

Having thus described my invention, what I claim as new, and desire to secure by Letters Patent, is—

1. In a power-transmitting mechanism, the combination of a power-shaft, a conical driving-gear slidably mounted thereon, a spring adapted to normally hold said gear in operative position, a lever adapted to withdraw said gear from its operative position, a counter-shaft at right angles to the power-shaft, a pair of pinions feathered on said counter-shaft on opposite sides of said gear, and means for moving said pinions alternately to and from their desired positions of engagement with said gear, consisting of pivotally-connected rods, and a lever for oppositely actuating said rods in unison.

2. In a power-transmitting mechanism for automobiles, the combination of a power-shaft, a conical driving-gear slidably mounted thereon, a spring adapted to normally hold said gear in operative position, a lever adapted to withdraw said gear from its operative position, a counter-shaft at right angles to the power-shaft, a pair of conical pinions feathered on said counter-shaft being relatively smaller and on opposite sides of said driving-gear, pivotally-connected rods adapted to move said conical pinions alternately to and from their desired positions of engagement with said gear, and a lever for oppositely actuating said rods in unison.

3. In a power-transmitting mechanism for automobiles, the combination of a power-shaft, a conical driving-gear slidably mounted thereon, a spring adapted to normally hold said gear in operative position, a lever adapted to withdraw said gear from its operative position, a counter-shaft at right angles to the power-shaft, a pair of conical pinions feathered on said counter-shaft being relatively smaller and on opposite sides of said driving-gear, pivotally-connected rods adjustably mounted on a fixed bracket and adapted to move said conical pinions alternately to and from their desired positions of engagement with said gear, and a lever for oppositely actuating said rods in unison, as and for the purpose described.

In witness whereof I have hereunto set my hand.

CHARLES CARSON VAUGHN.

Witnesses:
GEO. J. MCCONNELL,
D. B. RICHARDS.